United States Patent [19]
Lansberry

[11] Patent Number: 5,465,771
[45] Date of Patent: Nov. 14, 1995

[54] WOOD PROCESSING APPARATUS WITH IMPACT HAMMER

[75] Inventor: John B. Lansberry, Woodland, Pa.

[73] Assignee: Stone & Wood, Inc., Woodland, Pa.

[21] Appl. No.: 341,904

[22] Filed: Nov. 15, 1994

[51] Int. Cl.⁶ .............. B27L 1/00; A01G 23/02; A01G 23/08
[52] U.S. Cl. .............. 144/343; 37/302; 144/2 Z; 144/34 E; 144/338; 173/122
[58] Field of Search .............. 173/44, 87, 122; 37/301, 302; 144/2 Z, 3 D, 34 R, 34 A, 34 E, 337, 338, 347

[56] References Cited

U.S. PATENT DOCUMENTS

| | | | |
|---|---|---|---|
| 2,474,037 | 6/1949 | Cuthrell | 144/134 A |
| 2,499,620 | 3/1950 | Alderman . | |
| 2,895,236 | 7/1959 | Pilch . | |
| 3,333,615 | 8/1967 | Robbins . | |
| 3,376,907 | 4/1968 | McNeal | 144/2 N |
| 3,421,558 | 1/1969 | Thompson | 144/34 E |
| 3,688,824 | 9/1972 | Bodine | 144/34 A |
| 3,719,217 | 3/1973 | Bottoms . | |
| 3,762,481 | 10/1973 | Allen et al. . | |
| 3,774,659 | 11/1973 | Bodine . | |
| 3,914,883 | 10/1975 | Bodine . | |
| 3,927,704 | 12/1975 | Wirt . | |
| 3,943,984 | 3/1976 | Kinsley, Jr. | 144/2 N |
| 3,958,613 | 5/1976 | Herz . | |
| 3,989,075 | 11/1976 | Cougran, Jr. | 144/2 N |
| 3,999,582 | 12/1976 | Allen et al. . | |
| 4,067,369 | 1/1978 | Harmon . | |
| 4,141,398 | 2/1979 | Widegren et al. | 144/2 N |
| 4,467,848 | 8/1984 | Schmid . | |
| 4,624,293 | 11/1986 | Suezaki . | |
| 4,751,949 | 6/1988 | Berner . | |
| 4,913,203 | 4/1990 | Lessard . | |
| 5,082,036 | 1/1992 | Vierikko . | |

FOREIGN PATENT DOCUMENTS 1690615  11/1991  U.S.S.R. .............. 144/2 N

Primary Examiner—W. Donald Bray
Attorney, Agent, or Firm—Cushman Darby & Cushman

[57] ABSTRACT

An apparatus is provided for delimbing tree limbs of a felled tree including housing structure constructed and arranged to be movable to a tree processing location. Support and feeding structure is constructed and arranged with respect to the housing structure to support a stem portion of the tree while a limb thereof is severed and to move the stem portion progressively through the housing structure. Blade structure is mounted on the housing structure and is constructed and arranged to move into engagement with a limb. Impact hammer structure is operatively coupled to the blade structure such that successive impacts generated by the impact hammer structure on the blade structure move the blade structure progressively thorough a limb. Actuating structure is operatively associated with the blade structure and is constructed and arranged to move the blade structure into engagement with a limb such that when the stem portion is supported by the support and feed structure and the blade structure is engaging the limb, the successive impacts generated by the impact hammer structure move the blade structure to sever the limb from the stem portion of the tree.

10 Claims, 5 Drawing Sheets

5,465,771

WOOD PROCESSING APPARATUS WITH IMPACT HAMMER

The present invention relates to harvesting and processing timber, and, more particularly, to a method and apparatus for delimbing felled trees.

Conventional methods and apparatus have been developed to harvest standing trees and to thereafter delimb felled trees. Once such apparatus was disclosed in U.S. Pat. No. 3,999,582 which utilizes opposing pivoting shear blades operated by associated hydraulic fluid actuators. The shear blades are brought into contact with the tree and are moved by the actuators toward each other to shear the tree. The device also includes encircling members which encircle the tree stem and, upon upward movement thereof, delimb the tree stem. Other conventional delimbing methods include sawing, chipping, or ripping the limbs by circular motion of a cutting device.

The aforementioned delimbing methods work well in the soft wood, but are not as effective in hard woods. For example, significant force is required to shear limbs of hard wood. Further, the conventional delimbing methods, such as the use of chain saws, creates an extremely hazardous task.

Accordingly, need exists to provide a method and apparatus for delimbing both soft wood and hard wood felled trees, without requiring manual chain saw duty or a device which requires significant force to delimb a tree.

SUMMARY OF THE INVENTION

An object of the present invention is to fulfill the need referred to above. In accordance with the principles of the present invention, this objective is obtained by providing an apparatus for delimbing tree limbs of a felled tree. The apparatus includes housing structure constructed and arranged to be movable to a tree processing location. Support and feed structure is constructed and arranged with respect to the housing structure to support a stem portion of the tree while a limb thereof is severed, and to move the stem portion progressively through the housing structure. Blade structure is mounted on the housing structure and is constructed and arranged to move into engagement with a limb. Impact hammer structure is operatively coupled to the blade structure such that successive impacts generated by the impact hammer structure on the blade structure moves the blade structure progressively thorough a limb. Actuating structure is operatively associated with the blade structure and is constructed and arranged to move the blade structure into engagement with a limb such that when the stem portion is supported by the support and feed structure and the blade structure is engaging the limb, the successive impacts generated by the impact hammer structure moves the blade structure to sever the limb from the stem portion of the tree.

Another object of the invention is to provide a method for delimbing felled trees with a cutting apparatus. The cutting apparatus includes support and feed structure constructed and arranged to support and feed a stem portion of the tree in an axial direction through the cutting apparatus. The cutting apparatus includes blade structure and impact hammer structure associated therewith. The method includes feeding the stem portion axially into the cutting apparatus by the support and feed structure and operating the impact hammer structure to progressively move the blade structure through limbs disposed about the periphery of the tree so as to remove the limbs at points substantially adjacent the stem portion as the stem portion is moved through the cutting apparatus.

Another object of the present invention is the provision of an apparatus of the type described which is simple in construction, effective in operation and economical to manufacture and maintain.

These and other objects of the present invention will become apparent during the course of the following detailed description and appended claims.

The invention may be best understood with reference to the accompanying drawings wherein an illustrative embodiment is shown.

Figure 1:
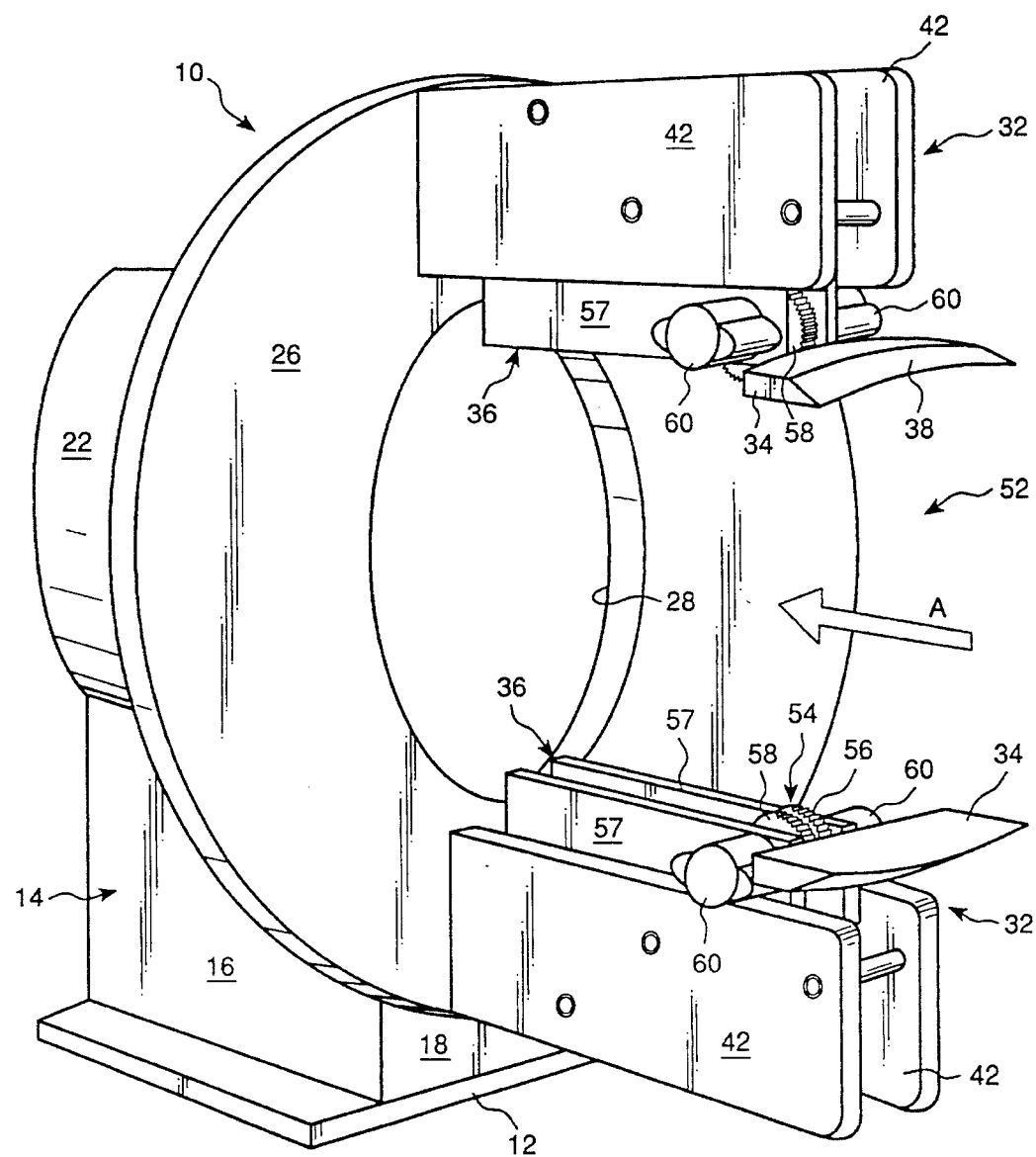
FIG. 1 is a front perspective view of a two-blade impact hammer delimber apparatus provided in accordance with the principles of the present invention, shown without the rotating structure for clarity.

Referring now more particularly to the drawings, an impact hammer delimber apparatus, generally indicated at 10, which embodies the principles of the present invention is shown. The delimber apparatus includes housing structure including a support assembly having a base portion 12 which is constructed and arranged to be trailer mounted, for example in a manner shown in FIG. 5, or affixed to a tree harvester or similar wheeled vehicle; and a support stand, generally indicated at 14, mounted to the base portion 12 so as to extend vertically therefrom. The support stand 14 of the housing structure includes opposing sidewalls 16, a front wall 18 and a rear wall 20. The support assembly further includes a generally cylindrical base tube 22 affixed to the support stand 14. The base tube 22 includes an axial opening 24 therethrough which is adapted to receive stems of felled trees. A plate 26 of the housing structure is mounted to the base tube 22 for rotary motion with respect thereto and includes an bore 28 therethrough sized to mate generally with the opening 24 of the base tube 22. In the illustrated embodiment, the bore 28 is approximately 30 inches in diameter so as to accept a 30 inch diameter tree stem.

Mounted to the front face of the plate 26 is actuating structure, generally indicated at 32. In the illustrated embodiment, the actuating structure includes a pair of actuating assemblies 36 spaced 180° apart on the plate 26. Each actuating assembly 36 is operatively associated with a cutting blade or blade structure 34 to move the cutting blade 34 into engagement with a tree. As shown, each cutting blade 34 has a curved cutting edge 38 preferably angled approximately 30 degrees with respect to the horizontal, to facilitate delimbing.

Figure 3:
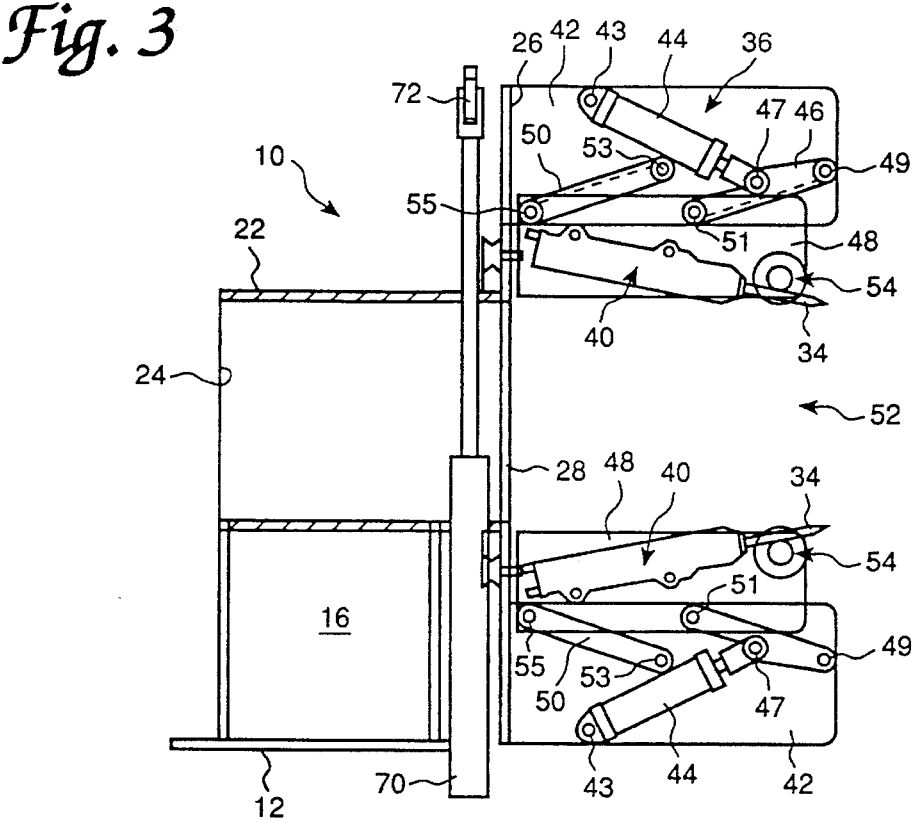
FIG. 3 is a schematic illustration of a side view of the impact hammer delimber apparatus of FIG. 1, shown in position to receive and delimb a large diameter tree stem, shown with the rotating structure for rotating a portion of the apparatus.

With reference to FIG. 3, the apparatus 10 includes impact hammer structure comprising a plurality of conventional impact hammers 40 such that each cutting blade 34 is operatively coupled to an associated impact hammer 40. The tool portion of the impact hammer 40 is coupled to the cutting blade 34 such that successive impacts of the impact hammer 40 on the cutting blade 34 move the cutting blade 34 progressively through a limb of a tree, as will be apparent below. As noted above, each impact hammer 40 may be of any conventional construction having an impact class of approximately 175/130 J/ft-lb. For example, Rammer Corporation Model S-23, NKP Co. Model No. H-08X or INDECO Corp. Model No. MES181 impact hammer could be used.

As noted above, each actuating assembly 36 is operatively associated with an associated impact hammer 40 and cutting blade 34 so as to move the associated cutting edge 38 into engagement with a limb. With reference to FIGS. 1 and 3, each actuating assembly 36 includes a pair of stationary plates 42 mounted to the plate 26. A hydraulic cylinder 44 is affixed at one end thereof between the stationary plates 42 by pin 43. The piston end of the hydraulic cylinder 44 is coupled to a swing arm 46 at pin 47. One end of the swing arm 46 is pivotally coupled between the stationary plates 42 via pin 49 while a second end of the swing arm 46 is pivotably coupled to a swing plate assembly 48 via pin 51. A second swing arm 50 is pivotably coupled between the stationary plates 42 at one end thereof at pin 53 and pivotally coupled to the swing plate assembly 48 at another end thereof via pin 55. The swing plate assembly includes a pair of spaced swing plates 57. The impact hammer structure 40, with cutting blade 34 attached, is fixedly mounted to the swing plate assembly 48 between the pair of swing plates 57.

Figure 4:
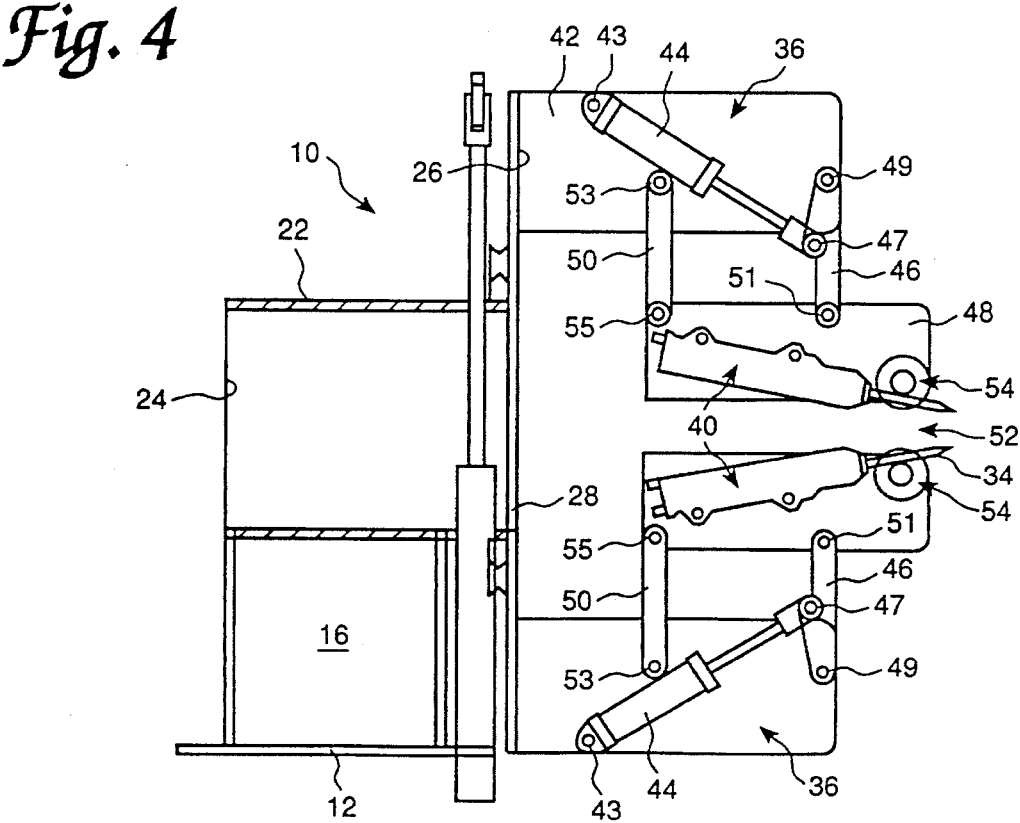
FIG. 4 is a schematic illustration similar to FIG. 3 showing the apparatus in position to receive and delimb a small diameter tree stem.

As shown in FIG. 3, the actuating assemblies 36 are disposed in position to accept a 30 inch diameter tree within an opening 52 therebetween. In this position, each cylinder 44 is retracted which in turn retracts an associated swing arm assembly 48 to the position shown. Upon actuating the cylinders 44, the pistons extend, thereby rotating the associated swing arm assembly 48 to a position shown in FIG. 4, whereby the swing arm assemblies 48 are moved toward each other thereby reducing the opening 52 to receive smaller trees or to accommodate the reducing diameter of the tree stem as the stem is moved through the apparatus from its trunk portion to its distal end portion. In the illustrated embodiment, the size of opening 52 is adjustable between 4 and 30 inches.

As shown in FIG. 1, mounted on each swing arm assembly 48 is support and feed structure in the form of a drive wheel assembly 54. Each drive wheel assembly 54 includes two spaced toothed wheels 56, 58 mounted between the swing plates 57. Each drive wheel assembly 54 is adjustable and moves with an associated swing arm assembly 48 and is driven by a pair of conventional hydraulic motors 60. The drive wheel assemblies 54 cooperate to support the tree stem during a delimbing procedure and to move the tree stem through the apparatus 10.

Figure 2:
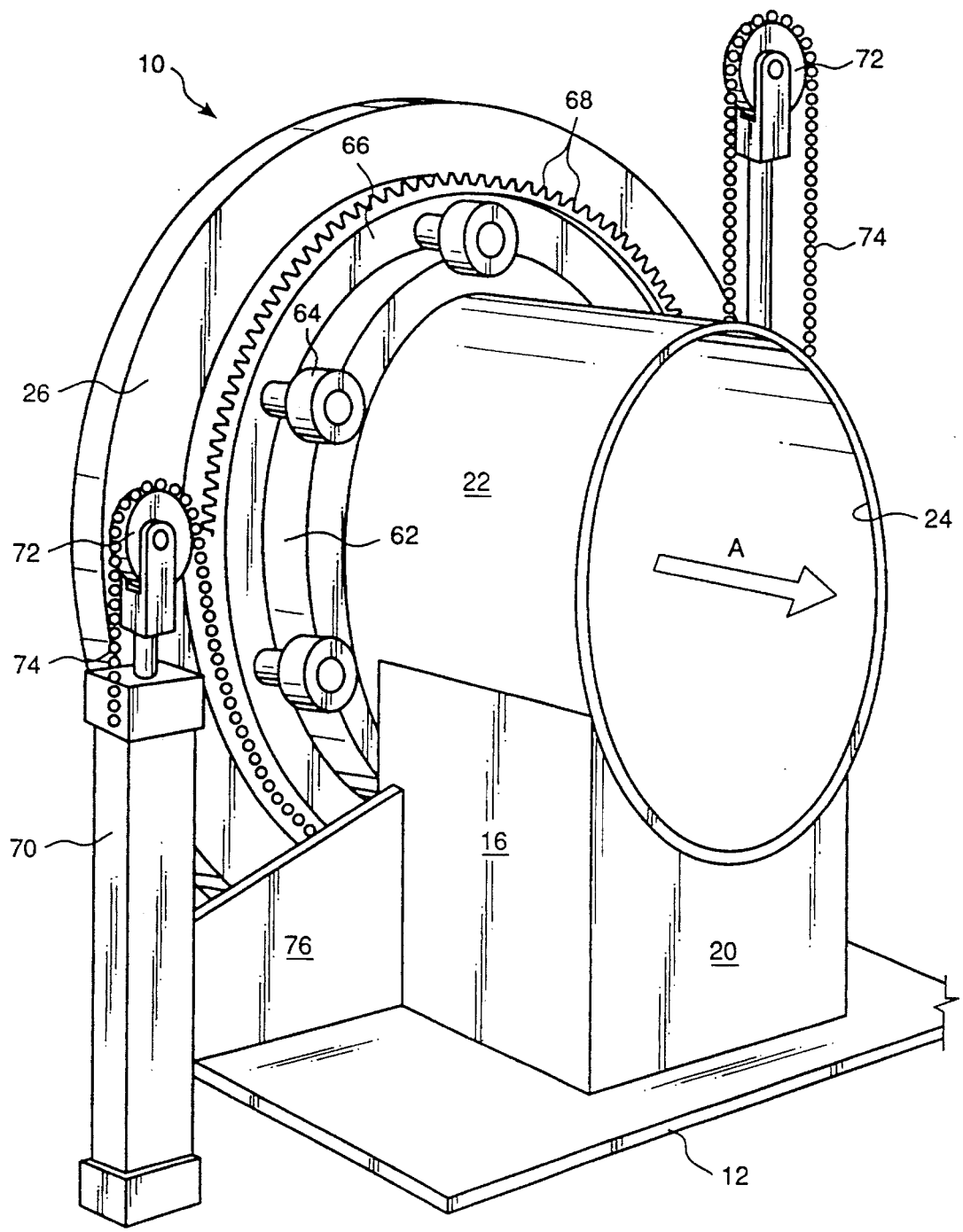
FIG. 2 is a rear perspective view of the impact hammer delimber apparatus of FIG. 1.

When only two cutting blades are provided, it is preferable to rotate the plate 26 between 0° and 180° so that limbs about the entire periphery of the tree stem may be delimbed. Thus, as shown in FIG. 2, a race ring 62 is mounted to the peripheral portion of the base tube 22 at a proximal portion thereof. The plate 26 is rotatably supported on the race ring 62 via a plurality of spaced bearings 64. The plate 26 includes a sprocket member 66 having a plurality of sprocket segments 68. To provide a structure for rotating the plate 26, a pair of power cylinders 70 are provided, one disposed on each side of the base plate 12. Each power cylinder 70 includes a chain support member 72 for supporting a portion of a chain 74. As shown in FIG. 2, the chain 74 extends from each support member 72 and cooperates with the sprocket segments 68 such that alternating up and down movement of the cylinders 70 causes the plate 26 to swing between 0° and 180°. The power cylinders 70 are coupled to the base plate via arm members 76. Note that the power cylinders and arm members are not shown in FIG. 1.

Figure 5:
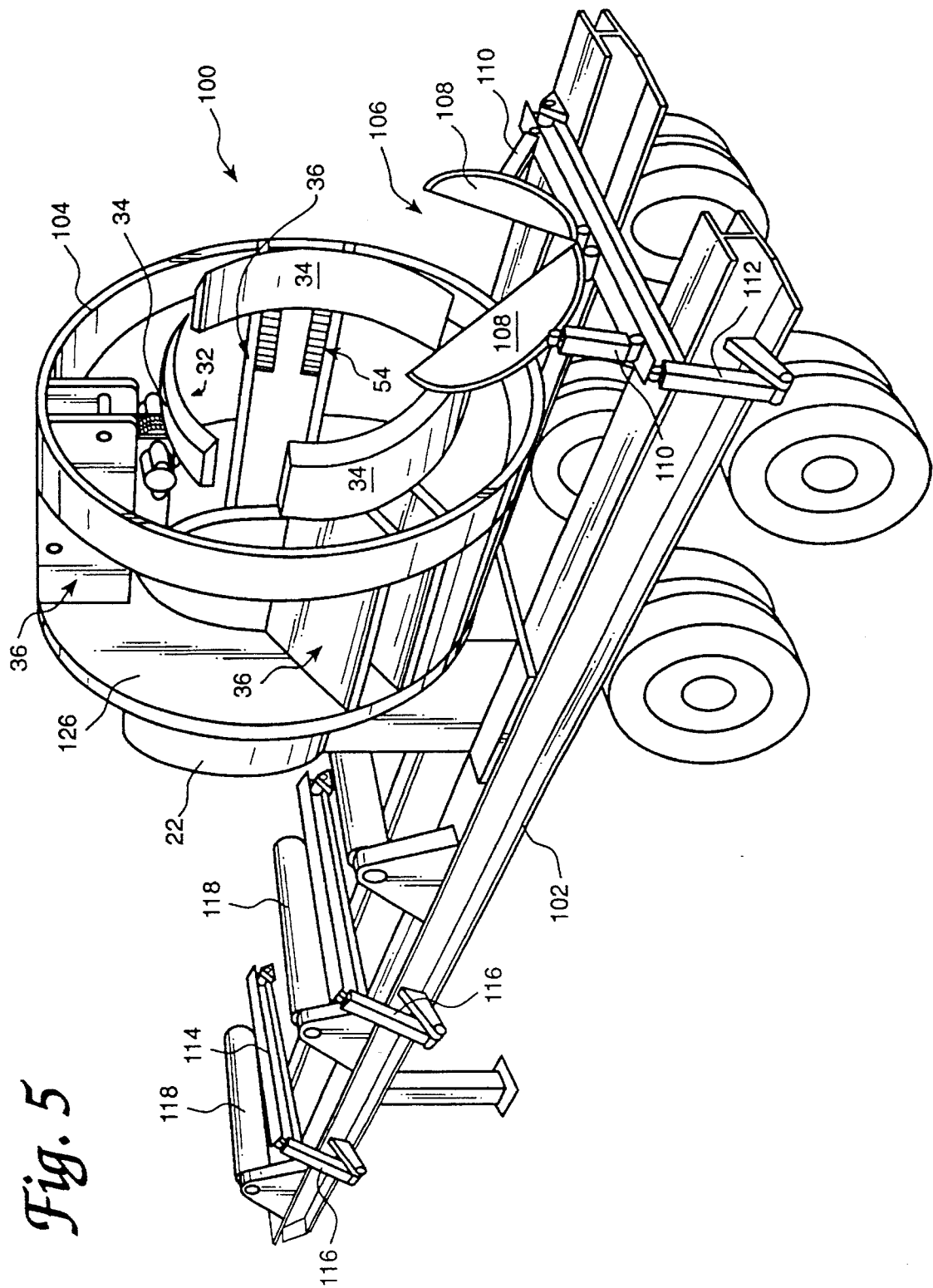
FIG. 5 is a perspective view of a trailer mounted three-blade impact hammer delimber apparatus provided in accordance with the principles of the present invention.

With reference to drawings, the operation of the delimber apparatus 10 will be appreciated. A felled tree is brought to the opening 52 by loader or the like such that the large diameter trunk portion is inserted first into the opening 52. The cylinders 44 are actuated such that the cutting blade edges 38 are moved into engagement with the tree stem. The tree is moved in the direction of arrow A through the apparatus 10 by the drive wheel assemblies 54. The impact hammer structure 40 is in a neutral mode until resistance is experienced. Thus, once the cutting blade 34 is in contact with an associated limb of the tree, the associated impact hammer 40 begins to fire into the limb in response to pressure and resistance. To insure that limbs are removed around the entire periphery of the tree stem, the power cylinders 70 are actuated so as to swing the plate 26 between 0° and 180°, thereby swinging the cutting blades 34 between 0° and 180° such that the complete 360° periphery of the tree stem can be delimbed. As the diameter of the tree stem becomes smaller near the distal end thereof, the cylinders 44 operate to move the swing plate assembly 48 toward each other (FIG. 4) so as to maintain contact of the cutting blades 34 with the tree stem. Positioning of the cutting blades is therefore adjustable to accommodate 30 to 4 inch diameter tree stems. When approximately a 4 inch diameter portion of the tree has been reached, the waste end of the tree is sheared-off by any conventional method. FIG. 5 shows a conventional tree topper shear blade assembly, generally indicated at 106, for shearing-off the waste end of the tree which will be explained below more fully. Since the diameter of the tree waste portion is small, the forces required to sever the waste portion by shearing are not significant.

FIG. 5 shows in another embodiment of the impact hammer delimber apparatus provided in accordance with the principles of the present invention. Common parts are given the same numerals as in the previous embodiment, and only the differences between the two embodiments are discussed. As shown, the delimber apparatus 100 is mounted on a wheeled trailer 102. The delimber apparatus 100 includes three actuating assemblies 36 and associated cutting blades 34 and impact hammers 40. The cutting blades 34 are spaced approximately 120° apart. The actuating assemblies, cutting blades and impact hammers are identical to those previously described. However, since the cutting blades 34 are arranged to ensure that the entire periphery of the tree stem may be delimbed, there is no need to rotate a rotary plate as in the apparatus 10. Thus, plate 126 is fixed to the base tube 22. Further, the power cylinders of FIG. 2 are not required. The apparatus 100 includes a support ring 104 coupled to the actuating assemblies 36 for increased support.

Mounted on the trailer 102 in front of the apparatus 100 is a tree topper shear assembly, generally indicated at 106. The assembly 106 includes two opposing shear blades 108, each being controlled by an associated hydraulic cylinder 110. Movement of the cylinders 110 from the position shown closes the blades 108 to shear-off the waste portion of the tree. A hydraulic positioning cylinder 112 is coupled to the assembly 106 so as to adjust the height thereof to place the assembly 106 a range of vertical positions.

At the rear of the trailer 102, a plurality of tree trunk exit rails 114 are provided which receive the delimbed stem as it exits the apparatus 100. Each exit rail 114 is vertically adjustable via an associated hydraulic cylinder 116 coupled thereto. A series of rollers 118 are mounted on the trailer 102 adjacent the exit rails 114 for ease in handling the delimbed stem.

Although not shown, it can appreciated that four cutting blades can be mounted 45° apart so as to cover the entire 360° periphery of a tree, without the need to rotate a portion of the apparatus.

Figure 6:
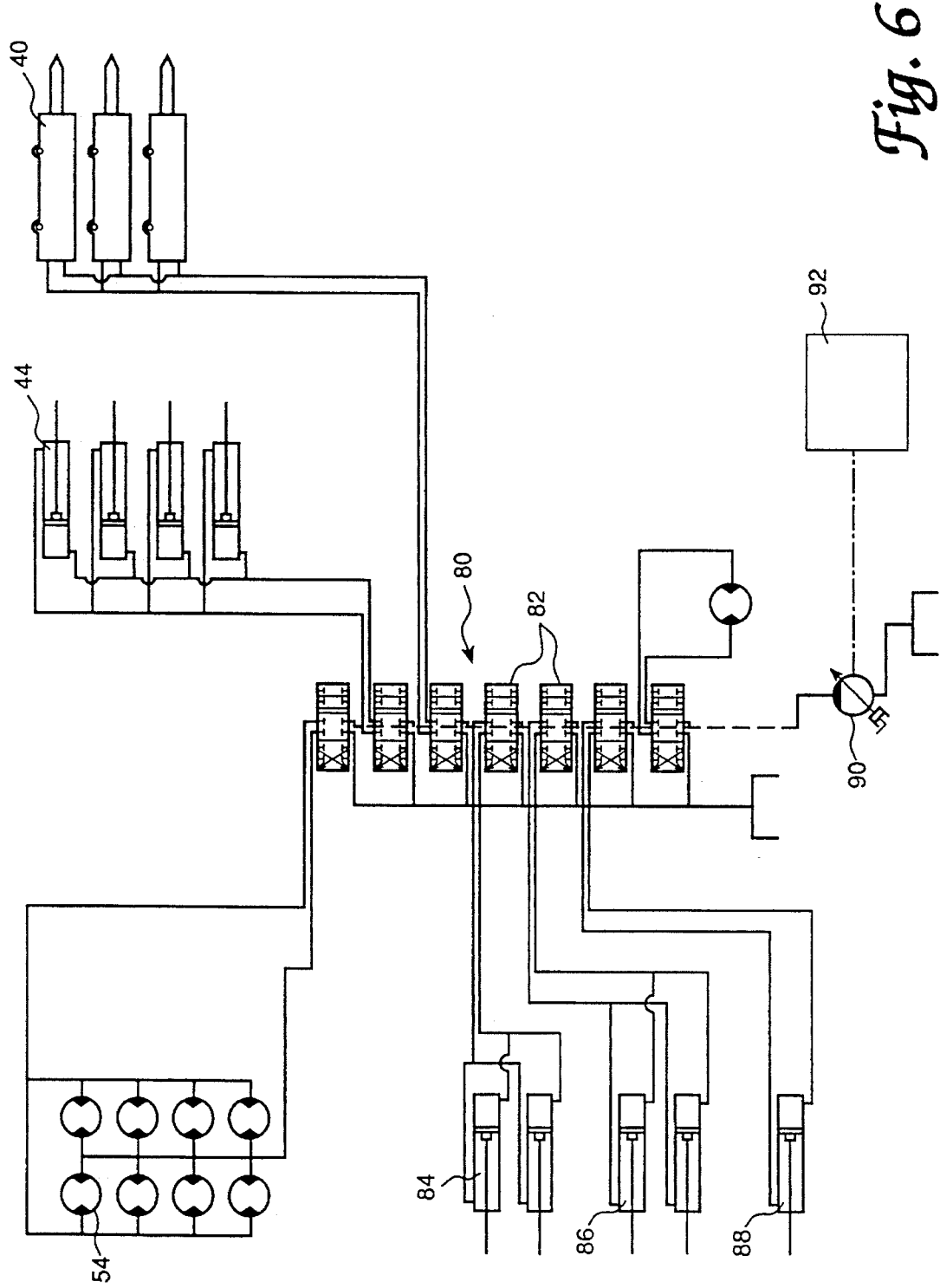
FIG. 6 is a schematic illustration of a hydraulic circuit for an impact hammer delimber apparatus of the invention.

A hydraulic circuit for the apparatus 100 having three impact hammers 40 is shown in FIG. 6. A control valve assembly, generally indicated at 80, is provided to control the operation of the apparatus 100. In the illustrated embodiment, the control valve assembly 80 includes seven conventional control valves 82 for controlling the drive wheel assemblies 54, the hydraulic cylinders 44 of the actuating assemblies 36, the impact hammers 40, the tree trunk exit rails cylinders 116, the tree topper shear cylinders 110, and the tree topper shear assembly positioning cylinder 112. A supply pump 90 supplies hydraulic fluid to the control valves assembly 80. Hydraulic oil pressure is supplied by engine 92. It can be appreciated that instead of providing engine 92, the hydraulic oil and pressure may be supplied by from the auxiliary hydraulics of a vehicle (not shown).

The aforementioned impact cutting method works well in hard wood trees and equally well in soft wood trees. It can be appreciated that pneumatic, hydraulic or electric, mechanical inertial-type of energy may be utilized to provide the impact force for the cutting action.

It can be appreciated that the delimber structure of the invention provides an easy and effective way to delimb trees without the danger of injury caused by manual chain sawing or the like.

Although the invention has been described with reference to delimbing a felled tree, it is within the contemplation of the invention to provide impact hammer structure for debarking of logs. Conventional type debarkers are either flail, ring, drum or rosser head which are very costly to produce and maintain. The use of impact hammers for debarking provides a cost effective way of performing the debarking function.

It thus will be seen at the objects of this invention had been fully and effectively accomplished. It will be realized, however, that the foregoing preferred embodiment of the present invention has been shown and described for the purposes of illustrating the structural and functional principles of the present invention and are subject to change without the departure from such principles. Therefore, this invention includes all modifications encompassed within the spirit of the following claims.

What is claimed is:

1. An apparatus for delimbing tree limbs of a felled tree, comprising:

housing structure constructed and arranged to be movable to a tree processing location;

support and feed structure constructed and arranged with respect to said housing structure to support a stem portion of the tree while a limb thereof is severed and to feed the stem portion progressively through the housing structure;

blade structure mounted on said housing structure and constructed and arranged to move into engagement with a limb;

impact hammer structure operatively associated with said blade structure such that successive impacts generated by said impact hammer structure on said blade structure move said blade structure progressively thorough a limb; and actuating structure operatively associated with said blade structure and impact hammer structure and constructed and arranged to move said blade structure into engagement with a limb such that when the stem portion is supported by said support and feed structure and the blade structure is engaging the limb, the successive impacts generated by the impact hammer structure move the blade structure to sever the limb from the stem portion of the tree.

2. The apparatus according to claim 1, wherein said blade structure comprises a plurality of cutting blades, said impact hammer structure comprising a plurality of impact hammers, one impact hammer being associated with one cutting blade for moving the associated cutting blade to sever an engaged limb, said actuating structure including an actuating assembly associated with each cutting blade and impact hammer.

3. The apparatus according to claim 2, wherein said housing structure includes a support assembly and a plate mounted to the support assembly, said plate including a bore therethrough sized to receive the stem portion of the felled tree, said actuating assemblies being mounted on said plate, said impact hammers and associated cutting blades being coupled to an associated actuating assembly in such a manner so as to define an opening therebetween and to be movable with respect to the plate by said associated actuating assembly to close said opening such that the cutting blades may sever limbs of various diameter trees.

4. The apparatus according to claim 3, wherein each actuating assembly includes:

a pair of stationary plates mounted to said plate, and a hydraulic cylinder fixed at one end thereof between said stationary plates, a piston of said cylinder being coupled to a swing arm, said swing arm being coupled between said stationary plates at one end thereof, another end of said swing arm being coupled to a swing plate assembly, an associated impact hammer and cutting blade being mounted on said swing plate assembly such that movement of said piston rotates said swing arm and moves said swing plate assembly with respect to the plate to close said opening such that the cutting blades may sever limbs of various diameter trees.

5. The apparatus according to claim 3, wherein two actuating assemblies with associated cutting blades and impact hammers are mounted 180 degrees apart on said plate, said plate being mounted for rotation with respect to said support assembly so that said cutting blades can sever limbs about the entire periphery of the stem portion of the tree.

6. The apparatus according to claim 3, wherein at least three actuating assemblies with associated cutting blades and impact hammers are mounted fixedly mounted on said plate in such a manner that limbs on the entire periphery of the stem portion of the tree can be severed.

7. The apparatus according to claim 5, wherein said apparatus further comprises structure constructed and arranged to rotate said plate between 0° and 180° so that said two cutting blades are positioned to sever limbs disposed about a periphery of the tree.

8. The apparatus according to claim 1, wherein said support and feed structure includes a plurality of drive wheels constructed and arranged to support and guidingly feed the stem portion of the tree past said blade structure in such a manner that said blade structure may sever the limb from the tree.

9. The apparatus according to claim 8, wherein said plurality of drive wheels are each driven by an associated hydraulic motor.

10. A method of delimbing a felled tree with a cutting apparatus, the cutting apparatus including support and feeding structure constructed and arranged to support and feed a stem portion of the tree in an axial direction through the cutting apparatus, said cutting apparatus including blade structure and impact hammer structure associated therewith, the method comprising the steps of:

feeding the stem portion axially into said cutting apparatus by said support and feeding structure, and operating the impact hammer structure to progressively move the blade structure through limbs disposed about the periphery of the tree so as to remove the limbs at points substantially adjacent the stem portion as the stem portion is moved through the cutting apparatus.

* * * * *